Figure 7:
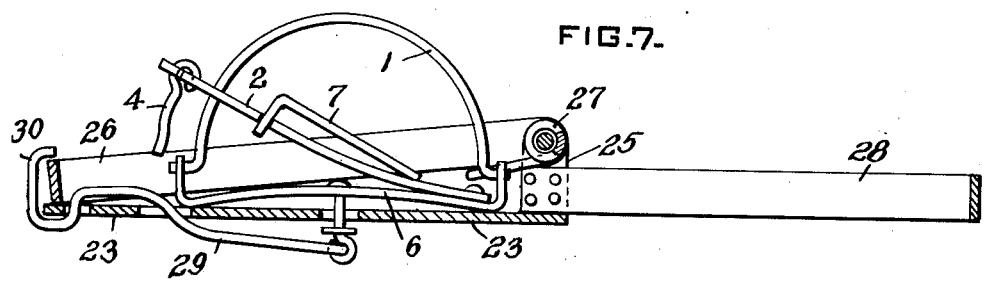

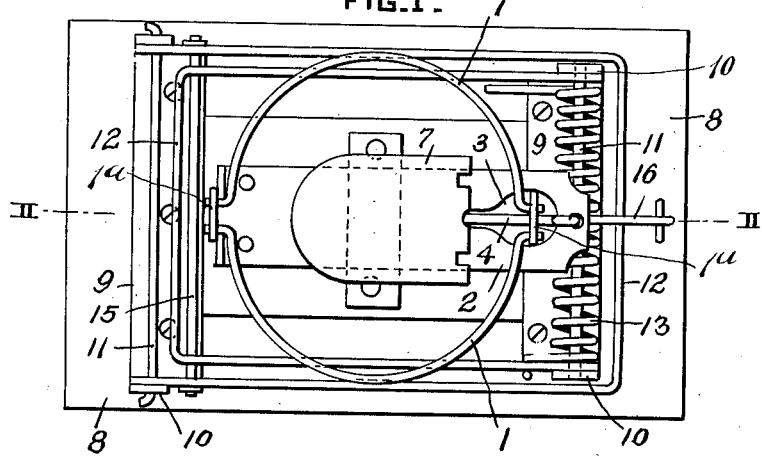
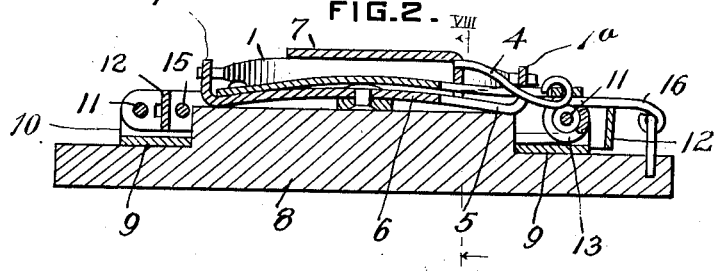
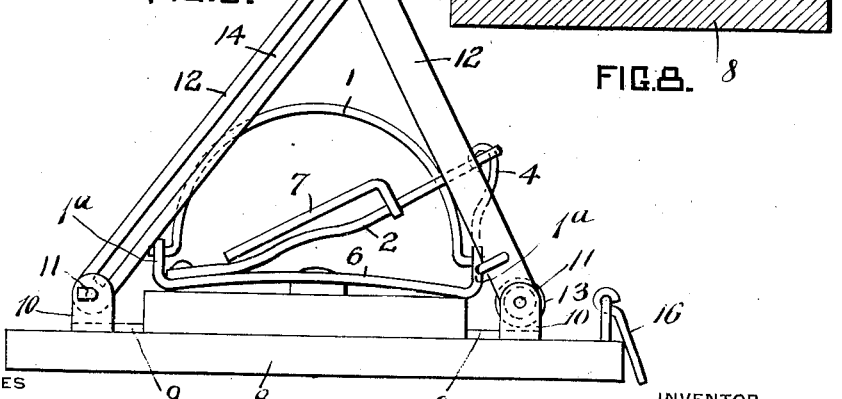

W. A. GIBBS.
TRAP.
APPLICATION FILED JUNE 16, 1916.
1,333,017.
Patented Mar. 9, 1920.
3 SHEETS—SHEET 2.
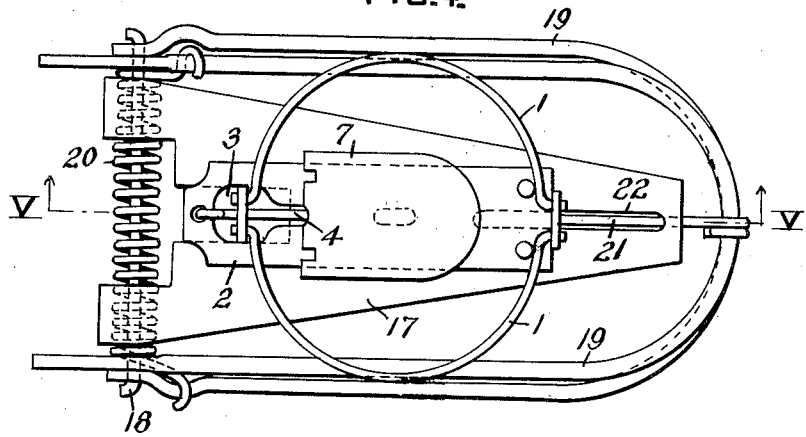
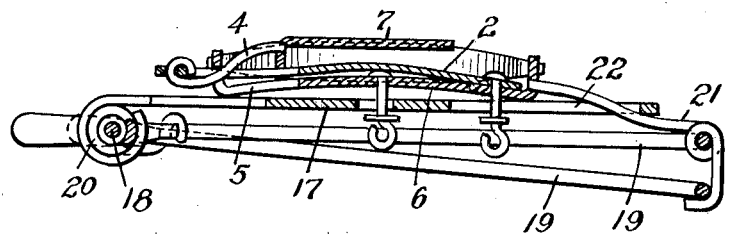
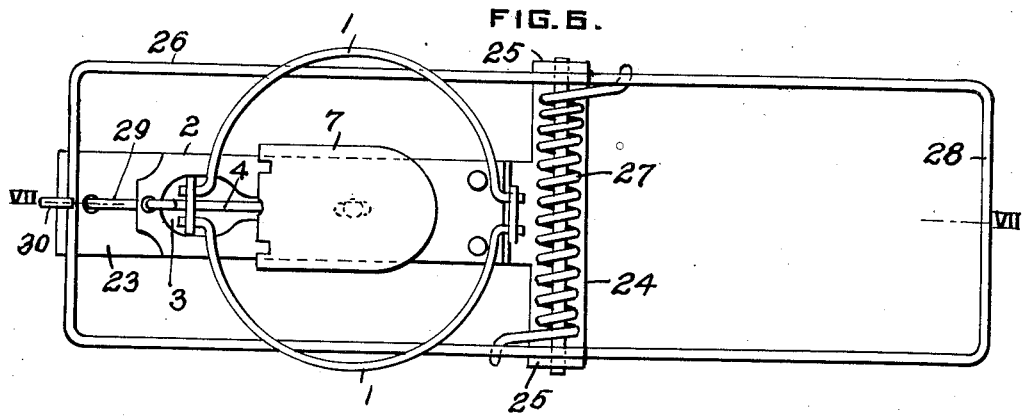
WITNESSES
J. Herbert Bradley.
INVENTOR
Walter A. Gibbs
by Dannis S. Wolcott
Atty

W. A. GIBBS.
TRAP.
APPLICATION FILED JUNE 16, 1916.

1,333,017.

Patented Mar. 9, 1920.
3 SHEETS—SHEET 3.

WITNESSES
J. Herbert Bradley.

INVENTOR
Walter A. Gibbs
by Darwin S. Wolcott
Atty

UNITED STATES PATENT OFFICE.

WALTER A. GIBBS, OF WILMINGTON, DELAWARE.

TRAP.

1,333,017.  Specification of Letters Patent.  Patented Mar. 9, 1920.

Application filed June 16, 1916. Serial No. 104,070.

*To all whom it may concern:*

Be it known that I, WALTER A. GIBBS, residing at Wilmington, in the county of New Castle and State of Delaware, a citizen of the United States, have invented or discovered certain new and useful Improvements in Traps, of which improvement the following is a specification.

In the accompanying drawings forming a part of this specification, Figure 1 is a top plan view showing a form of double trap embodying my improvements, the traps being in open or operative position; Fig. 2 is a sectional view on a plane indicated by the line II—II, Fig. 1; Fig. 3 is a side elevation showing the trap closed; Fig. 4 is a plan view of another form of the construction shown in Figs. 1, 2 and 3; Fig. 5 is a sectional view on a plane indicated by the line V—V, Fig. 4; Fig. 6 is a top plan view of another form showing the traps in operative positions; Fig. 7 is a sectional view on a plane indicated by the line VII—VII Fig. 6; and Fig. 8 is a sectional view on a plane indicated by the line VIII—VIII, Fig. 2.

In the construction shown in Figs. 1, 2 and 3, I employ a primary trap which may be of the usual or any suitable construction, consisting of jaws pivotally mounted in lugs 1ª formed on the base 6 of the trap and adapted to be shifted and held in closed position by a spring 2 provided with an eye 3 through which portions of the jaws are passed, a catch or latch 4, which in the construction shown has one end pivoted to the outer end of the spring 2 and is adapted to be turned down and passed into a slot 5 in the base 6 of the trap, and a treadle or trigger plate 7 pivotally mounted on the spring and adapted to engage the free end of the latch 4, thereby locking the spring down in position to permit the opening of the jaws. When the foot or any part of an animal strikes the treadle, it will release the latch 4 and permit the spring to move up and close the jaws and lock them in closed position. This trap or any other trap of suitable construction, is mounted on a suitable base 8 on which are also mounted plates 9, having upturned lugs 10 at their ends, adapted to serve as supports for the pivot pins 11 of the substantially U-shaped jaws 12. The supports for the pivot pins of the jaws are arranged on opposite sides of the primary trap and when the jaws are turned down into operative position, the sides thereof lie parallel with each other, and with the axes of the jaws of the primary trap. Around one or both of the pivot pins 11, of these jaws, is arranged a spring or springs 13, having one end in engagement with the jaws and the opposite end bearing against a stationary abutment, as the base of the trap, so that when the jaws are free to move, they will be turned upwardly or into closed position as shown in Fig. 3. The sides or legs of one of the jaws are slotted as at 14, and through these slots is passed a pin 15, secured to the other jaw. This construction insures the simultaneous movement of both jaws and if desired permits the use of only one actuating spring, as the movement of one jaw will cause a corresponding movement of the other jaw. These jaws are held in open or operative position by means of a trigger 16 pivoted to the base and adapted to overlie one of the jaws and be held in locked position by the spring or other part of the primary trap.

When an animal steps on the treadle of the primary trap, its spring will be released and the jaws closed, gripping the animal. The movement of the spring 2 will release the jaws 12 of the secondary trap which will move up and grip another portion of the body of the animal above the primary trap.

In the construction shown in Figs. 4 and 5, the primary trap which may be of the same construction as that shown in Figs. 1, 2 and 3, or of any other suitable construction, is movably mounted on a plate 17 which is pivotally connected at one end to the pivot pin 18 of the jaws 19, of the secondary trap. Around the pivot pin of the secondary jaws is wound a spring 20, having one end attached to one of the secondary jaws, and the opposite end to the other jaw, so that when free to move, these jaws will be simultaneously turned toward each other and meeting at any point in the circle which they describe and encircling the primary trap in such movement, will grip the animal previously caught in the latter. In setting the trap, the secondary or auxiliary jaws 19 are turned on their pivot pin into approximate parallelism with each other, as shown in Figs. 4 and 5 and are locked in this position by a catch 21, mounted on one of the jaws and having a bent portion adapted to engage the other jaw, while another portion will extend through a slot 22 in the plate 17 and into an opening in one of the lugs of the primary trap. When the primary trap is sprung and catches the animal, the movement of the animal will so shift the primary trap as to release the catch 21 holding the secondary jaws and therefore permit them to be operated by the spring and close over and around the primary trap.

In Figs. 6 and 7, is shown a modification of the construction shown in Figs. 4 and 5, and in this modification, the primary trap is connected to a stationary or fixed base 23 which is provided at one end with a cross arm 24, having lugs 25, to which is pivotally mounted a secondary jaw 26, adapted when released and shifted by the spring 27 to sweep over the primary trap and close against a stationary jaw 28. This movable jaw 26 is held in open position by a trigger 29 having one end connected to the primary trap. This trigger is mounted in the base 23, so that when shifted by a movement of the primary trap, the bent end 30 of the trigger will be shifted out of engagement with the jaw 26, which may be of any suitable construction, such for example as that shown in Figs. 1, 2 and 3.

I claim herein as my invention:

1. The combination of a primary trap and a secondary trap each trap consisting of a pair of jaws said pairs being disposed at an angle one to the other, resilient means for shifting the jaws of each trap, means releasable by an animal for holding the jaws of the primary trap in open or operative position and means controlled by the moving or movement of the primary trap for locking the secondary trap in open or operative position.

2. The combination of a primary and a secondary trap, each trap consisting of a pair of jaws, said jaws being disposed at an angle the one to the other, resilient means for shifting the jaws of each pair relative to the other jaws, means for releasably holding the jaws of one pair in open or operative position and adapted to be actuated by an animal to release said jaws, and means controlled by the trap employing the latter pair of jaws for locking the secondary pair of jaws in open or operative position.

3. A primary trap consisting of spring actuated jaws and means for releasably holding the jaws of one pair in open or operative position and adapted to be actuated by the animal to release said jaws in combination with a secondary trap consisting of a pair of jaws one movable relative to the other on an axis outside of the path of movement of the primary jaws but so arranged relative to the primary trap that the secondary jaws will strike in their movement an animal gripped by the primary trap, a spring for shifting the secondary jaws and means controlled by the primary trap for holding the secondary trap in open or operative position.

4. A primary trap consisting of spring actuated jaws and means for releasably holding the jaws of one pair in open or operative position and adapted to be actuated by the animal to release said jaws in combination with a secondary trap consisting of jaws, a spring for actuating the secondary jaws relative to the other jaws in a direction at an angle to the direction of movement of the primary jaws and means controlled by the primary trap for locking the secondary trap in open or operative position.

5. The combination of a primary trap consisting of spring actuated jaws, means for releasably holding said jaws in open or operative position and adapted to be actuated by an animal to release said jaws, secondary jaws, one of said secondary jaws having its axis of movement at an angle to the axis of movement of the jaws of the primary trap, resilient means for shifting said jaws and means controlled by the primary trap for locking the secondary trap in open or operative position.

6. The combination of a primary and a secondary trap, each trap consisting of a pair of jaws, said pairs being disposed at an angle the one to the other, resilient means for shifting a jaw of each pair relative to the other jaw, means for releasably holding the jaw of one pair in open or operative position and adapted to be actuated by the animal to release said jaw and means controlled by the trap employing the latter pair of jaws for locking the secondary pair of jaws in open or operative position.

7. A primary trap consisting of spring-actuated jaws and means for releasably holding the jaws in open or operative position and adapted to be actuated by the animal to release said jaws in combination with a secondary trap consisting of a pair of jaws, one movable relative to the other on an axis outside of the path of movement of the primary jaws but so arranged relative to the primary trap that the secondary jaw will strike in its movement an animal gripped by the primary trap, a spring for shifting the secondary jaw and means controlled by the primary trap for holding the secondary trap in open or operative position.

8. A primary trap consisting of spring-actuated jaws and means for releasably holding the jaws in open or operative position and adapted to be actuated by the animal to release said jaws in combination with a secondary trap consisting of jaws, a spring for shifting a secondary jaw relative to the other jaw in a direction at an angle to the direction of movement of the primary jaws and means controlled by the primary trap for locking the secondary trap in open or operative position.

9. The combination of a primary trap consisting of spring-actuated jaws, means for releasably holding the jaws in open or operative position and adapted to be actuated by an animal to release said jaws, secondary jaws, one of said secondary jaws having its axis of movement at an angle to the axis of movement of the jaws of the primary trap, resilient means for shifting said jaws and means controlled by the primary trap for locking the secondary trap in open or operative position.

10. A double animal trap comprising a primary trap, and an auxiliary trap having a fixed and a movable jaw, the movable jaw of said auxiliary trap in its action of closing, swinging over said primary trap.

In testimony whereof, I have hereunto set my hand.

WALTER A. GIBBS.

Witnesses:
 THOS. D. LEARY,
 THEODORE W. FRANCIS.